(12) United States Patent
Harter et al.

(10) Patent No.: US 7,676,727 B2
(45) Date of Patent: Mar. 9, 2010

(54) SYSTEM AND METHOD FOR TRANSMITTING DATA IN A MOTOR VEHICLE

(75) Inventors: Werner Harter, Illingen (DE); Heikel Zarga, Schwäbisch Gmünd (DE); Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 955 days.

(21) Appl. No.: 10/534,603

(22) PCT Filed: Nov. 6, 2003

(86) PCT No.: PCT/DE03/03691

§ 371 (c)(1),
(2), (4) Date: Nov. 14, 2005

(87) PCT Pub. No.: WO2004/045131

PCT Pub. Date: May 27, 2004

(65) Prior Publication Data

US 2006/0156127 A1    Jul. 13, 2006

(30) Foreign Application Priority Data

Nov. 11, 2002    (DE) ............................. 102 52 230

(51) Int. Cl.
*G11C 29/00* (2006.01)
(52) U.S. Cl. ................. 714/763; 714/752; 714/758; 713/176
(58) Field of Classification Search .............. 714/763, 714/746, 752, 758, 800; 713/176, 180
See application file for complete search history.

(56) References Cited

U.S. PATENT DOCUMENTS 4,277,844 A * 7/1981 Hancock et al. ............. 714/755

(Continued)

FOREIGN PATENT DOCUMENTS

WO    02/35708    5/2002

OTHER PUBLICATIONS

Irvin D. R. "Preserving the integrity of cyclic redundancy checks when protected text is intentionally altered" Jan. 11, 1989, pp. 618-626, IBM Journal, vol. 33, No. 6.

(Continued)

*Primary Examiner*—Sam Rizk
(74) *Attorney, Agent, or Firm*—Kenyon & Kenyon LLP

(57) ABSTRACT

A method for transmitting data, in which a first signature is formed according to a specifiable signature formation method as a function of the data to be transmitted, the first signature is transmitted together with the data a second signature is formed according to the signature formation method as a function of the transmitted data and the first signature is compared with the second signature. To reduce the likelihood of fault masking in monitoring the transmission of the data using signature analysis, a provision is made to invert the data to be transmitted, to form the first signature according to the specifiable signature formation method as a function of the data to be transmitted and of the inverted Data, to transmit the first signature and the data to invert the transmitted data, to form the second signature according to the signature formation method as a function of these inverted data and the transmitted data, and to compare the first signature with the second signature.

10 Claims, 7 Drawing Sheets

U.S. PATENT DOCUMENTS

| | | | |
|---|---|---|---|
| 4,458,349 A * | 7/1984 | Aichelmann et al. | 714/6 |
| 4,736,376 A * | 4/1988 | Stiffler | 714/785 |
| 4,782,487 A * | 11/1988 | Smelser | 714/723 |
| 4,817,095 A * | 3/1989 | Smelser et al. | 714/764 |
| 5,003,539 A * | 3/1991 | Takemoto et al. | 714/785 |
| 5,014,273 A * | 5/1991 | Gagliardo et al. | 714/758 |
| 5,274,646 A * | 12/1993 | Brey et al. | 714/758 |
| 5,428,629 A * | 6/1995 | Gutman et al. | 714/758 |
| 5,938,784 A | 8/1999 | Kim | |
| 6,311,311 B1 * | 10/2001 | Swaney et al. | 716/4 |
| 6,457,154 B1 * | 9/2002 | Chen et al. | 714/768 |
| 6,480,800 B1 * | 11/2002 | Molyneaux et al. | 702/120 |
| 6,519,736 B1 * | 2/2003 | Chen et al. | 714/768 |
| 6,584,526 B1 * | 6/2003 | Bogin et al. | 710/124 |

OTHER PUBLICATIONS

M. Abramovici et al., "Digital Systems Testing And Testable Design", IEEE Press 1990.

R. N. Williams A Painless Guide to CRC Error Detection Algorithms, Version 3, Aug. 19, 1993, RocksoftΛtm Pty Ltd. Australia.

* cited by examiner

SYSTEM AND METHOD FOR TRANSMITTING DATA IN A MOTOR VEHICLE

FIELD OF THE INVENTION

The present invention relates to a method for transmitting data, in which according to a specifiable signature formation method a first signature is formed as a function of the data to be transmitted. The first signature is transmitted together with the data in so-called messages. Following the signature formation method, a second signature is formed as a function of the transmitted data and the first signature is compared to the second signature for the purpose of a signature analysis.

The present invention also relates to a computer program, which is executable on a control unit, particularly on a processing unit.

Finally, the present invention also relates to a control unit for a motor vehicle. The control unit includes a processing unit, which in particular takes the form of a microprocessor, and a memory element, which in particular takes the form of a random access read-write memory (RAM), of a read-only memory (ROM) or of a flash memory. A computer program is stored on the memory element, which is executable on the processing unit.

BACKGROUND INFORMATION

From the related art, signature analysis is known as a method for compressing data, which is based on the so-called CRC (cyclical redundancy check) method. As a function of the data to be transmitted, a resulting data word is formed according to a specifiable signature formation method, which constitutes the signature and characterizes the compressed data stream. The likelihood that a correct signature is formed in spite of faults in the data stream is very low and decreases with the data capacity of the signature word. Signatures are used, for example, for securing data transmissions, for monitoring read-only memories in computers and for identifying data streams such as for example of digital hardware signals in the context of testing circuits or data contained in a document. For the related art, reference is made to Abramovici, Miron, et al.: Digital Systems Testing and Testable Design, New York, IEEE Press, 1990.

In hardware, the signature is usually formed sequentially bit by bit with the aid of a linear feedback shift register (LFSR). It is known to implement this sequential signature analysis method in software as well. This method, however, is either very slow due to the sequential method of operation or it requires a relatively high amount of memory space for tables (so-called lookup tables) in order to shorten the computing time. Regarding the related art of such software-implemented sequential methods for signature analysis, reference is made to Williams, R. N.: A Painless Guide to CRC Error Detection Algorithms, Version 3, Aug. 19, 1993, Rocksoft Pty Ltd., Hazelwood Park 5066, Australia, ftp://ftp.rocksoft.com/Qapers/crc v3.txt.

Furthermore, a method for signature formation using a parallel method of operation (data word by data word) is known. This known method operates for example with the aid of a signature register having multiple inputs (MISR, multiple input shift register). The parallel method of operation, for example, allows for 32 bit input data to be processed in one step using a 32 bit processor. A method of this kind is known, for example, from U.S. Pat. No. 5,938,784.

Especially for safety applications in a motor vehicle such as, for example, steer-by-wire or autonomous driving, fault-tolerant and therefore redundant electronic systems are used that have a high demand for secure data exchange between systems, control units, computers and/or processing units. This communication can occur on three levels of communication. A system communication between two or more control units occurs, for example, via a bus system such as, for example, CAN (controller area network), TTCAN (time triggered CAN), FlexRay or TTP/C (time triggered protocol class C). A control unit-control unit communication or a computer-computer communication involving two control units or computers occurs via interfaces such as, for example, RS232, RS422, SPI (serial peripheral interface) or SCI (serial communications interface). A processing unit-processing unit communication occurs within a control unit. Since in these systems, in addition to computing time, data communication time also represents a bottleneck, using the MISR method to safeguard the many data communications is especially advantageous. It reduces to a minimum the computing time required for safeguarding the data communication in the sender and in the receiver.

In the case of the known methods, it may happen—even if it is an extremely rare occurrence—that a faultless signature is formed in spite of faulty data within a message. That is to say that, although the data to be transmitted and the transmitted data do not match each other, the first signature formed via the data to be transmitted and the second signature formed via the transmitted data match nevertheless. This is known as fault masking.

SUMMARY OF THE INVENTION

An objective of the present invention is to provide a method for the monitoring of data transmission that allows for a rapid formation of a signature and reduces the likelihood of fault masking.

To achieve this objective, the present invention, starting from the method of the kind mentioned at the beginning, provides for the data to be transmitted to be inverted, for the first signature to be formed, according to the specifiable signature formation method, as a function of the data and of the inverted data, the first signature and the data to be transmitted, the transmitted data to be inverted, the second signature to be formed, according to the signature formation method, as a function of these inverted data and of the transmitted data, and the first signature to be compared to the second signature.

According to the present invention, the signature is formed not only via the data to be transmitted and the transmitted data, but also via the inverted data. The additional processing of the inverted data is able clearly to reduce the likelihood of fault masking. The additional effort to process the inverted data is low such that it is still possible to achieve short computing times. The method according to the present invention is therefore particularly suitable for use in safety applications in a motor vehicle.

The method according to the present invention may be implemented both in terms of hardware as well as in terms of software. The implementation in terms of software has the advantage of lower costs and of a lower weight since no hardware components are required for the set-up. In addition, a software implementation provides greater flexibility (may be reprogrammed and adapted to new requirements without great effort).

An advantageous refinement of the present invention provides for the first signature and/or the second signature to be formed in a bit parallel manner (word by word) using a signature register having multiple inputs (MISR; multiple input shift register). This increases the speed of the signature formation.

In a preferred specific embodiment of the present invention, the first signature and/or the second signature are formed via the data of several messages. That is to say that, rather than securing the data of each transmitted message individually using a separate signature, the data of several messages are secured jointly. This manages to reduce the data volume of the data to be transmitted for the signature analysis.

For this purpose, a signature is advantageously transmitted by being distributed over several messages. This so-called method of distributed signature transmission, in which the common signature is distributed across the messages containing the data to be secured, represents an additional possibility for reducing the data volume to be transmitted. A control unit, for example, transmits on a CAN bus per system cycle three messages at a maximum of eight bytes each, which are in each case to be secured by a 32 bit signature. If the data are processed at the receiving unit only after all three messages have been received, then it makes sense to secure the data of the messages, not individually using 32 bits, but jointly using 32 bits and to distribute the 32 bit (equivalent to four bytes) signature data in such a way that the messages are optimally utilized in terms of data load. On the one hand, this reduces the data volume for the data transmission (four byte signature instead of 12 byte signature) and, on the other hand, the transmitted signature is not as susceptible to data corruption (masking) caused by fault since the signature is not transmitted as one block, but rather as three partial blocks together with the individual data words at different times.

In safety-related systems such as steer-by-wire, autonomous driving, automatic tracking as well as systems for controlling vehicle dynamics via a network system made up of brake, steering, chassis and so on, multi-computer systems are used for safety reasons. In this context, two, three or four processing units are used per control unit. In the case of airplanes and in space flight, systems having five or more processing units per control unit may even be used. A basic principle of these multi-computer systems is that prior to the start of calculations all input data are exchanged among the processing units and subsequently the start data for the calculation are reconciled with a precision of one bit (so-called input voting). The results of the calculation are likewise exchanged between all processing units and are compared for one-bit precision (so-called output voting).

If the data to be transmitted are input data of one-bit precision, which, for example, arrive at the processing units in messages via databuses, or calculation results, which are generated in parallel on several computers in a redundant manner, then preferably only the respective signatures are transmitted for verifying a match of these data.

Especially when using the particularly fast and reliable method according to the present invention for signature formation, this allows for the data volume to be transmitted to be reduced and for a processing speed to be increased.

Advantageously, the method according to the present invention is used for verifying the memory content of a read-only memory, flash memory or of a read-write memory. This allows for an efficient verification of the data consistency of the memory content.

Preferably, in this use according to the present invention, the data of the memory content to be verified are inverted, the first signature is formed according to the specifiable signature formation method as a function of the data to be verified and of the inverted data and stored as a setpoint signature in a memory area of a read-only memory, flash memory or a read-write memory. For verifying the data existing in the memory area to be verified, these data are inverted, the second signature is formed according to the signature formation method as a function of these inverted data and of the data and is compared to the stored setpoint signature. That is to say, a first signature, the so-called setpoint signature, is generated once via a memory content to be verified and is stored. If this memory content is then to be verified, for example, at a later point in time, then a second signature is generated via the current memory content and is compared to the stored setpoint signature. If these signatures do not match, it may be assumed that the content of the memory area to be monitored has changed. This allows for a particularly efficient verification of a memory area with respect to data consistency since only the signatures must be compared in order to verify the data. Moreover, the setpoint signature has to be formed only once.

Implementing the method of the present invention in the form of a computer program is of particular significance. The computer program is executable on a control unit, particularly on a processing unit, and is suitable for executing the method according to the present invention. Thus, in this case, the present invention is implemented by the computer program, so that this computer program represents the present invention in the same manner as does the method, for the execution of which the computer program is suitable. The computer program is preferably stored in a memory element. Particularly an electrical memory medium may be used as a memory element, for example a random access read-write memory (RAM), a read-only memory (ROM) or a flash memory.

As another way of achieving the objective of the present invention, starting from the control unit of the kind mentioned at the beginning, it is provided that the control unit is suitable for executing the method according to the present invention if the computer program is executed on the control unit, in particular on a processing unit included in the control unit.

DETAILED DESCRIPTION

From the related art, signature analysis is known as a method for compressing data, which is based on the so-called CRC (cyclical redundancy check) method. As a function of the data to be transmitted, following a specifiable signature formation method, a resulting data word is formed, which represents the signature and characterizes the compressed data stream. The likelihood that the correct signature is formed in spite of errors in the data stream is very low and decreases with the data capacity of the signature word. Signatures are used, for example, for securing data transmissions, for monitoring read-only memories in computers and for identifying data streams such as of digital hardware signals, for example, in the context of testing circuits or data contained in a document.

In hardware, the signature is usually formed bit by bit with the aid of a linear feedback shift register (LFSR). It is known to implement this sequential signature analysis method in software as well. This method, however, is either very slow due to the sequential method of operation or it requires a relatively high amount of memory space for tables (so-called lookup tables) in order to shorten the computing time.

Furthermore, a method for signature formation using a parallel method of operation (data word by data word) is known. This known method operates for example with the aid of a signature register having several inputs (MISR, multiple input shift register). The parallel method of operation, for example, allows for 32 bit input data to be processed in one step using a 32 bit processor.

Especially for safety applications in a motor vehicle—such as steer-by-wire or autonomous driving, for example—fault-tolerant and therefore redundant electronic systems are used that have a high demand for secure data exchange between systems, control units, computers and processing units. Since in these systems, in addition to computing time, data communication time also represents a bottleneck, using the MISR method to safeguard the many data communications offers a decisive advantage. It reduces to a minimum the computing time required for safeguarding the data communication in the sender and in the receiver. In the case of the known methods, it may happen that a faultless signature is formed in the receiving unit in spite of a faulty data transmission. This is known as fault masking.

In contrast, the method according to the present invention has the advantage that the likelihood of fault masking is clearly reduced.

Figure 1:
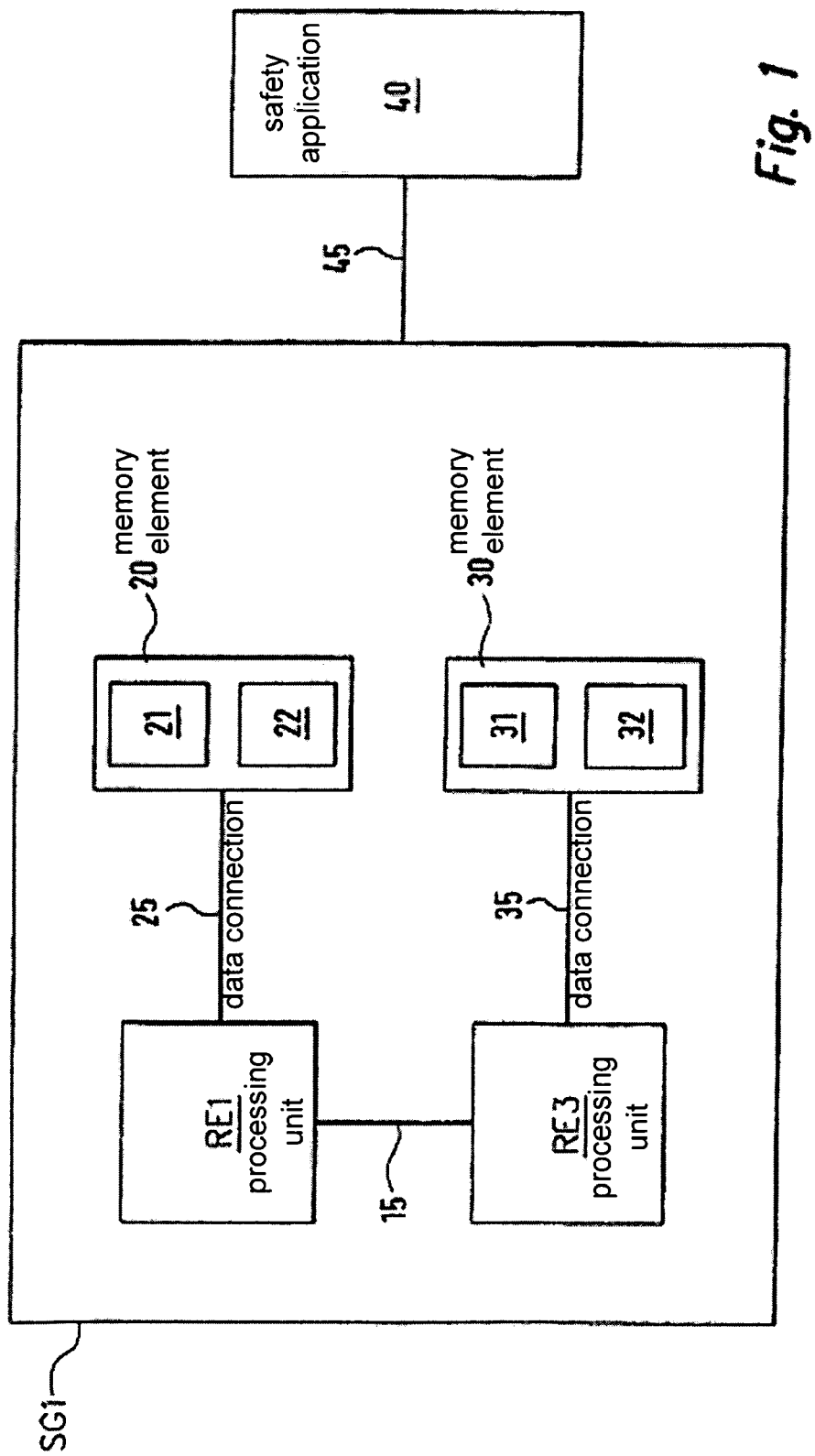
FIG. 1 shows a control unit according to the present invention according to a preferred specific embodiment for the control and/or regulation of a safety application in a motor vehicle.

FIG. 1 shows a control unit SG1 for controlling and/or regulating a safety application 40.

The method according to the present invention is implemented, for example, as a computer program, which is executed on the processing units RE1, RE3 of control unit SG1. The computer program is stored in memory areas 21, 31 of memory elements 20, 30, memory areas 21, 31 taking the form of read-only memories (ROM). For executing the computer program, the latter is transmitted via data connections 25, 35 to processing units RE1, RE3.

Results of calculations ascertained in the course of the execution of the computer program are transmitted in the opposite direction via data lines 25, 35 to memory elements 20, 30 and there are stored in memory areas 22, 32, which take the form of read-write memories (RAM, random access memory).

A possible method of operation of control unit SG1 is the following:

Via data line 45, control unit SG1 receives input variables that describe the state of safety application 40 to be controlled and/or regulated. These input variables are supplied to at least one processing unit RE1. There, a first signature of the data describing the input variables is generated by executing the computer program stored in memory area 21. These data are then transmitted together with the generated first signature via data line 15 to processing unit RE3. There, a second signature is generated from the received data and this is compared with the first signature received from processing unit RE1. If the two signatures match, it is assumed that the data transmitted from processing unit RE1 match the data received by processing unit RE3.

In another possible method of operation of control unit SG1, the input variables are supplied directly to the two processing units RE1, RE3. Thereupon, both processing units RE1, RE3 each form a first signature, which characterize the received input variables. Via data line 15, the signatures are then exchanged between processing units RE1, RE3. In each of the two processing units RE1, RE3, the signatures thus received are then compared with the first signature generated by the respective processing unit itself. If at least one of processing units RE1, RE3 establishes that the first signature it had generated itself and the signature received from the other processing unit do not match, then this processing unit causes the respective application or the entire control unit SG1 to enter a defined rest state (fail silent). Such a case of a fault, for example, may occur due to a fault in data line 15 or due to a fault in a data line having an associated logic circuit (not shown), which transmits the input variables within control unit SG1 from a data input to processing units RE1, RE3.

If the signatures of the input variables in both processing units RE1, RE3 match, then these input variables are processed further in accordance with the controlling and regulating task of control unit SG1. This generates resulting data required for controlling and/or regulating safety application 40.

From the resulting data generated in processing units RE1, RE3, processing units RE1, RE3 respectively generate a first signature. These first signatures are then exchanged via data line 15 with the other respective processing unit. Each processing unit RE1, RE3 then compares the signature thus received with the previously calculated first signature. If the two signatures do not match, then it is assumed that there is a transmission fault of the signatures or a calculation fault of the resulting data in at least one processing unit and appropriate measures (e.g. new calculation or fail silent) are triggered.

If in both processing units RE1, RE3, the signature calculated by the respective processing unit itself and the transmitted signature match, control unit SG1 causes these resulting data to be transmitted to safety application 40 via data line 45 for controlling safety application 40. Likewise, the associated signature is transmitted as a first signature to safety application 40. For this purpose, the signature may be transmitted as a separate message or may be distributed over several messages, for example, if the resulting data characterized by the signature themselves are also transmitted by being distributed over several messages. Thus the data volume of the data to be transmitted is reduced and the data to be transmitted becomes less susceptible to faults.

Figure 2:
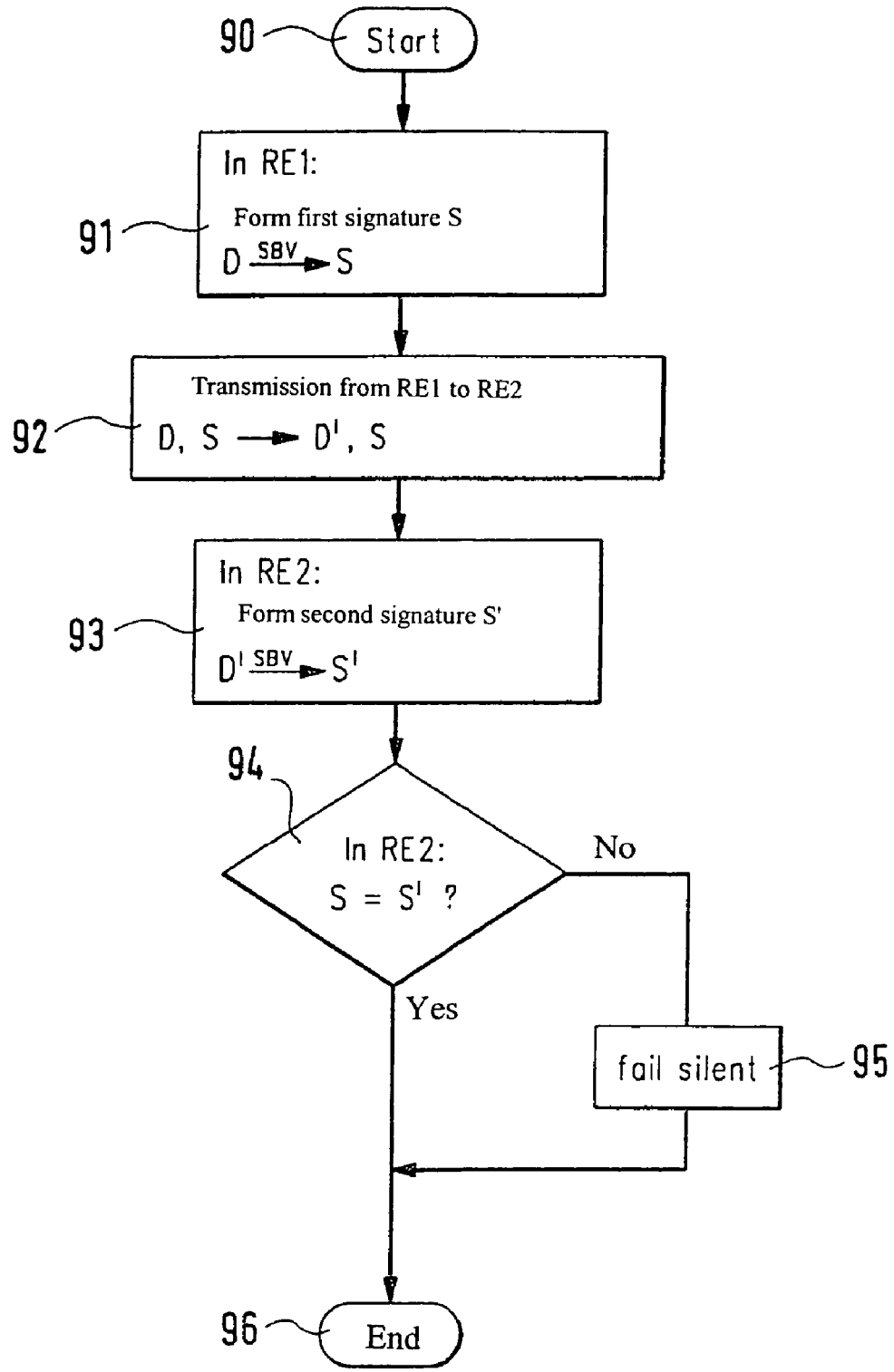
FIG. 2 shows a flow chart of a method according to the present invention for signature analysis.

FIG. 2 shows a flow chart of a method for signature analysis according to the present invention. Here it is assumed that a processing unit RE1 of a control unit SG1 transmits data to another processing unit RE2, which is part of another control unit SG2, and that in processing unit RE2, using a signature analysis, a check is to be performed as to whether there is a transmission fault.

To this end, the method is started in a step 90. In a step 91, first processing unit RE1 generates a first signature S as a function of the data D to be transmitted. A specifiable signature formation method SBV is used for this purpose. In a step 92, these data are transmitted together with first signature S to second processing unit RE2 with the aid of suitable messages. There, a second signature S' is generated from the transmitted data D' in a step 93, likewise in accordance with signature formation method SBV. In a query step 94, signatures S, S' are checked as to whether they match in processing unit RE2. If these signatures S, S' match, then it is assumed that there is no transmission fault and the method is terminated in step 96. If signatures S, S' differ, however, then a fault of data transmission is inferred and a method is started in a step 95, which transfers the underlying safety application into a defined state of rest (fail silent). Subsequently, the method ends in step 96.

Figure 3:
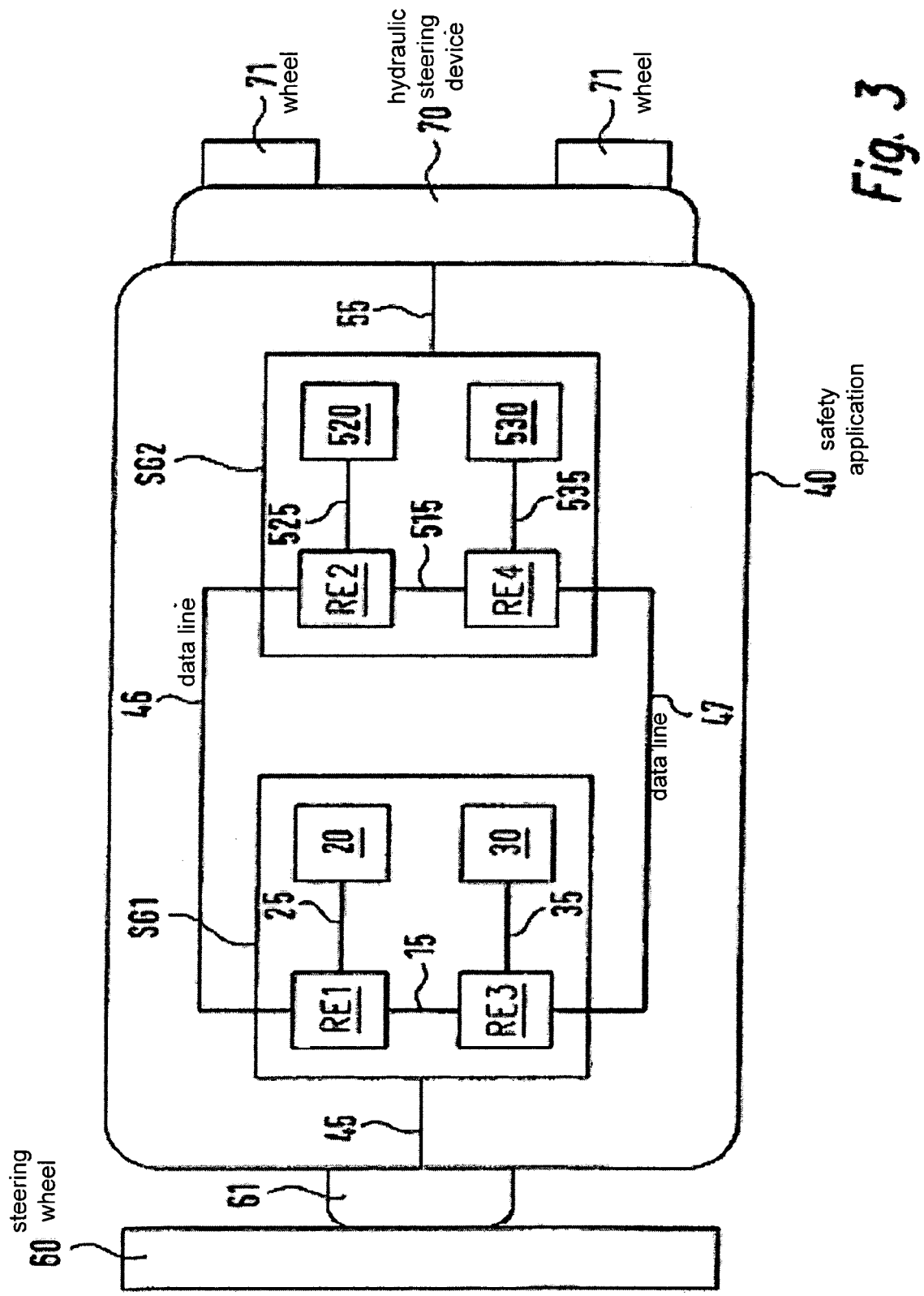
FIG. 3 shows a steer-by-wire system having two control units.

FIG. 3 shows a safety application 40 that is operated using two control units SG1, SG2. Here the elements existing in FIG. 1 correspond to the elements represented in FIG. 3 having the same reference characters. FIG. 3 additionally shows control unit SG2, which includes two processing units RE2, RE4 that are interconnected via a data line 515. Processing unit RE2 is connected to a memory element 520 by a data line 525, and processing unit RE4 is connected to a memory element 530 by a data line 535. Additionally, processing unit RE1 of control unit SG1 is connected to processing unit RE2 of control unit SG2 via dataline 46. Analogously, data line 47 connects processing unit RE3 with processing unit RE4.

An example of an application is a steer-by-wire system, in which, with the aid of an absolute angle sensor 61 attached to a steering wheel 60, a driver's steering input is detected and supplied to control unit SG1 by a data line 45, and the second control unit SG2 controls a hydraulic steering device 70, which causes wheels 71 to turn in.

For the secure data transmission between control units SG1, SG2, the two redundant data lines 46, 47 are implemented, for example as CAN, TTCAN or FlexRay. For a communication between control unit SG1 and control unit SG2, several messages are exchanged per control cycle, which contain, for example, measured variables, control variables and status information.

If a steering command is transmitted via data line 45, then a signature analysis is performed in processing units RE1, RE3 of control unit SG1 using the data thereby transmitted as in the method described in FIG. 1. Subsequently, the data are processed accordingly by computer programs stored in memory elements 20, 30. The resulting data thereby generated are again subjected to the signature analysis relating to processing units RE1, RE3 already shown in FIG. 1. If no fault of transmission or computation is detected in the process, then processing units RE1, RE3 transmit the resulting data to processing units RE2, RE4 of control unit SG2 via redundantly configured data lines 46, 47. Here too, the corresponding first signature is transmitted together with the data.

Processing units RE2, RE4 for their part now form a second signature independently of each other on the basis of the respectively received data and compare these with the transmitted first signature in order to detect a fault of the data during the transmission from control unit SG1 to control unit SG2.

Figure 4:
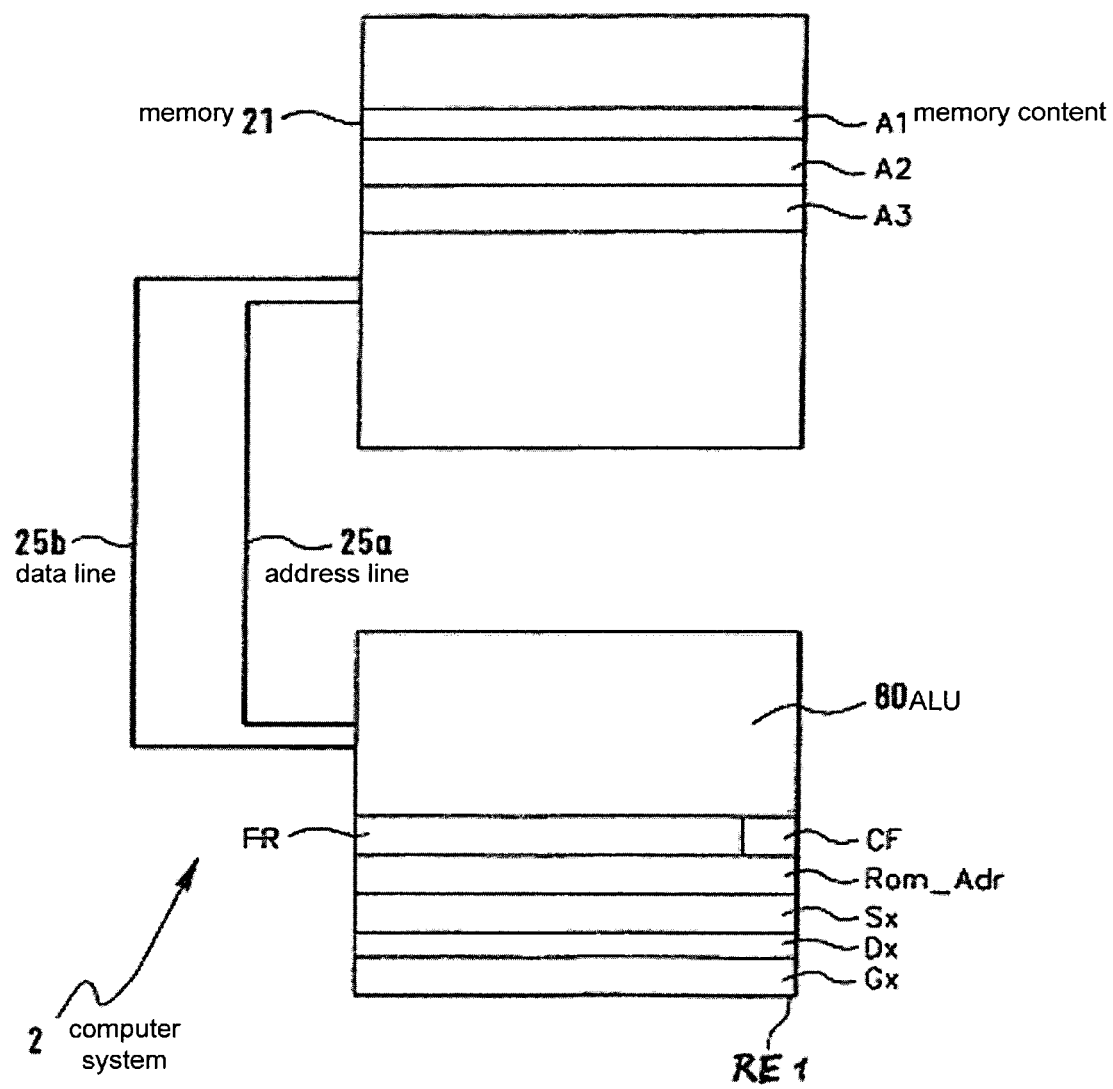
FIG. 4 shows a computer system suitable for processing a specific embodiment of the method according to present invention implemented in software.

FIG. 4 provides a schematic representation of a computer system 2 comprising a processing unit RE1 and a read-only memory 21. Processing unit RE1 includes a so-called ALU (arithmetic-logic unit) 80 and several registers FR, Rom_Adr, Sx, Dx, Gx for storing addresses and data. In addition, processing unit RE1 has a so-called carry flag CF, which is implemented by a 1 bit wide area of flag register FR. Processing unit RE1 and read-only memory 21 are connected via an address line 25a and a data line 25b. Read-only memory 21 includes addressable areas for storing data, of which FIG. 4 for reasons of clarity shows only three areas indicated by reference characters A1, A2, A3.

Figure 5:
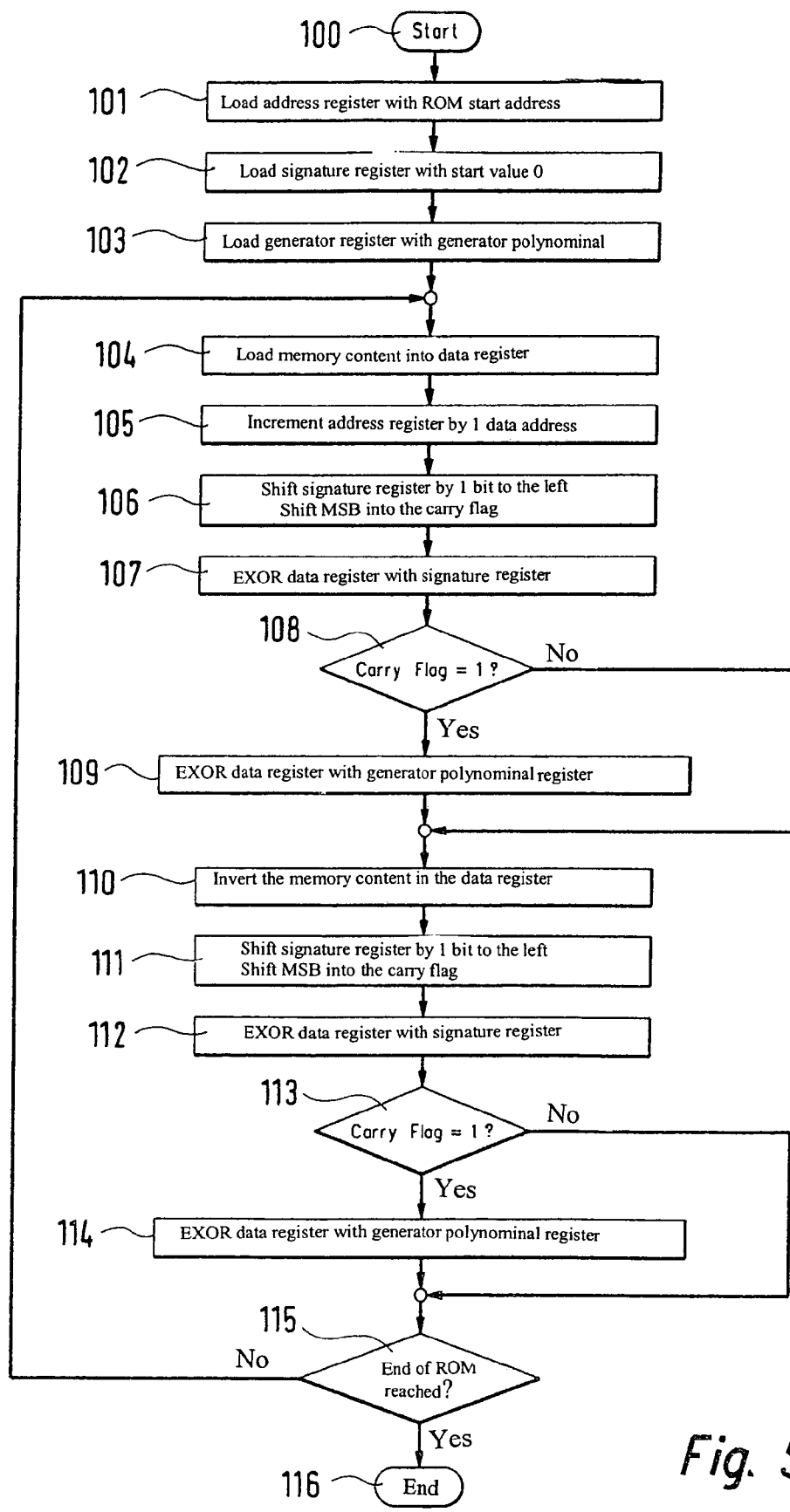
FIG. 5 shows a flowchart of a signature formation method according the present invention, according to a preferred specific embodiment.

Using a flow chart, FIG. 5 describes a signature formation running on computer system 2 of a method according to the present invention as represented, for example, in FIGS. 1, 3. The method begins in a step 100. In a step 101, an address register Rom_Adr is loaded with an address that refers to an addressable area A1 of read-only memory 21. In a step 102, a signature register Sx is initialized with the value zero. The method is designed in such a way that at the end of the method the calculated signature is located in signature register Sx. In a step 103, a generator polynomial suitable for forming over a set of data a signature characterizing these data is loaded into register Gx.

In a step 104, memory content A1, which is located in read-only memory 21 at the address stored in address register Rom_Adr, is loaded into register Dx of processing unit RE1. For this purpose, the address stored in register Rom_Adr, which refers, for example, to memory area A1, is transmitted to read-only memory 21 via address line 25a. Read-only memory 21 then sends the data located in the respective memory area A1 via data line 25b to processing unit RE1, where they are stored in register Dx. In a step 105, address register Rom_Adr is then incremented by one data address.

In a step 106, the content of signature register Sx is shifted by one position (corresponding to one bit) to the left (left-shift). This is based on a notation for binary data, in which the most significant bit, the so-called MSB, is always recorded on the left. This left-shift within signature register Sx has the effect that the MSB drops out of the respective data word and is stored in carry flag CF.

In a step 107, an EXOR operator is applied to data register Dx and signature register Sx with the aid of ALU 80, and the result is stored in signature register Sx. In a query step 108, a check is performed as to whether the value MSB stored in carry flag CF is equal to 1. If this is not the case, then the system branches to a step 110. If it is true that MSB=1, however, then in a step 109 the generator polynomial stored in register Gx is subtracted from the current value of signature register Sx, which is achieved by an EXOR operation in ALU 80.

In the following step 110, the content of data register Dx is now inverted. Subsequently, in step 111, the content of signature register Sx is once more shifted to the left by one bit and the bit that drops out is stored as MSB in carry flag CF, the value previously stored there being overwritten. In a step 112, an EXOR operator is applied to data register Dx and signature register Sx with the aid of ALU 80, and the result is stored in signature register Sx.

In a query step 113, a check is performed analogous to step 108 as to whether the value MSB stored in carry flag CF is equal to 1. If this is not the case, then the system branches to a query step 115. If it is true that MSB=1, however, then in a step 114 the generator polynomial stored in register Gx is subtracted from the current value of signature register Sx, which is again achieved by an EXOR operation in ALU 80.

In query step 115, a check is performed as to whether an end of the data word by which the signature is formed has already been reached. If this is not the case, the method is continued at step 104. If the end of the data word has been reached, the method ends, the generated signature being now located in signature register Sx.

The software method for signature formation provided according to the present invention works according to the so-called MISR (multiple input signature register) method. It reproduces in software the method known in hardware.

Figure 6:
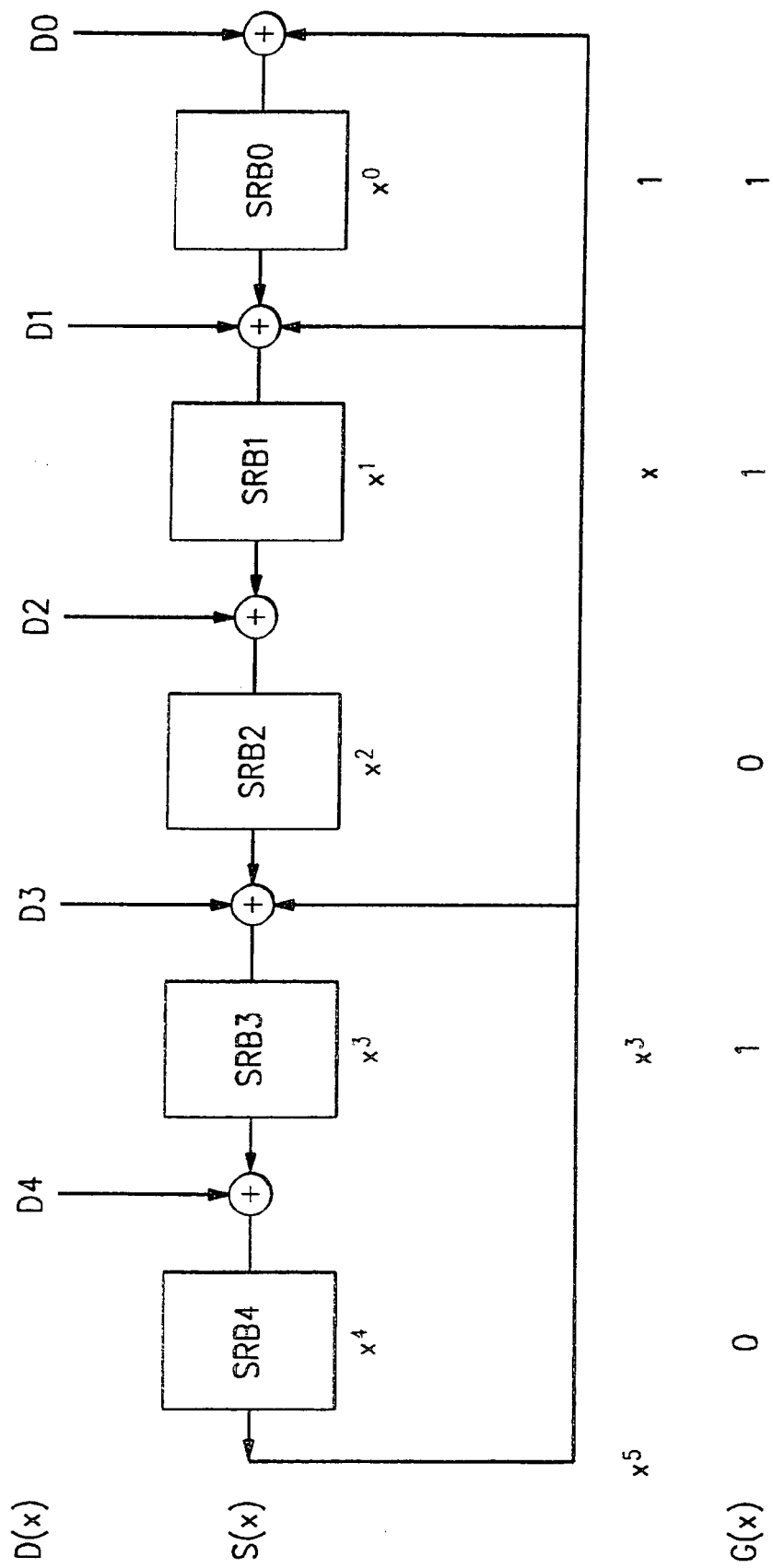
FIG. 6 shows the functional principle of the MISR signature formation method in hardware.

FIG. 6 shows a functional principle of the MISR method in hardware for data words of a width of 5 bit (D0 to D4). SRB0 to SRB4 represent 5 bit memories (flip-flops) of the feedback shift register for signature formation. A modulo 2 adder (+) having two or three inputs is located at each bit memory input.

At the first input of the adder, there is a bit of the data word D ($D_i$) to be compressed, at the second input there is the output of the bit memory SRB ($SRB_{i-1}$) lying in front of it, and at the third input there is possibly the output of the highest bit memory SRB4 of the shift register.

In the present case in which the data words are encoded in a binary manner, a modulo 2 adder forms the rest of the division ($D_i+SRB_{i-1}+SRB_4$)/2 or of the division ($Di+SRB_{i-1}$)/2. The entire signature register Sx likewise forms a remainder value. The entire input data block made up of data words having a length of 5 bits may be regarded in a simplified manner as a sequential data stream that is divided by a value, the divisor polynomial. The remainder of this division is subsequently located in signature register Sx.

Mathematically, the method of operation of signature registers may be described by the polynomial representation of binary numbers. For the polynomial representation of a binary number, the numerals 1 in the binary number are replaced by corresponding terms $x^n$, the exponent n corresponding to the significance of the respective 1. The divisor polynomial $G(x)=x^5+x^3+x^1+x^0$ in FIG. 6 has the corresponding binary number 101011. Since in addition to data compression, a divisor polynomial may also be used for data generation, the divisor polynomial is also referred to as generator polynomial $G(x)$. Likewise, the input data stream may also be represented as a polynomial $D(x)$ and the content of the signature register as polynomial $S(x)$.

In signature register Sx, the division by the divisor polynomial is performed through the repeated subtraction of the divisor polynomial value from the content of the shift register. Each time the value 1 is pushed out of the highest bit memory SRB4 and thus in a longer shift register the term $x^5$ would be placed in the non-existent bit memory SRB4 (according to carry flag CF in FIG. 4, 5), the value stored in the shift register is reduced by $x^5+x^3+x^1+x^0$. The shifting out of SRB4 reduces by $x^5$, while the feedback via the modulo 2 adder reduces the shift register value by $x^3+x^1+x^0$ because the modulo 2 addition in this case corresponds to a modulo 2 subtraction. The hardware representation of the divisor polynomial is formed by the feedback paths from the highest bit of the shift register to the modulo 2 adders.

In FIG. 6, the modulo 2 adders in front of the following bit memories are connected to SRB4: SRB3, SRB1, SRB0. The associated polynomial is $x^5+x^3+x^1+x^0$ The term $x^5$ having the exponent 5 (corresponding to the length of the shift register+1) is included because the most significant bit MSB is pushed out and thus subtracted. Mathematically, it can be shown that the remainder left in the signature register corresponds to the remainder that arises by the division of the data stream $D(x)$ by the generator polynomial $G(x)$.

Shown below using a recursive function are the mathematical operations required for forming the signature $S(x)$ in the signature register. In the equation below, $S_i(x)$: the current value of the signature register;
$S_{i+1}(x)$: the next value of the signature register following the processing of the data word; and
$D_i(x)$: the current value of the data register.

The signature following the ith processing cycle then is:

$$S_{i+1}(x)=[D_i(x)+xS_i(x)] \bmod G(x)$$

The multiplication of signature $Si(x)$ by x represents the shifting of the shift register to the left by one bit position (left-shift). The symbol "+" represents a modulo 2 addition or subtraction between the signature register and the current data word. The term $modG(x)$ signifies that the signature register always contains the remainder of the division $S(x)/G(x)$.

As already described, this is achieved in the hardware solution in that whenever the highest bit in the shift register=1, the generator polynomial $G(x)$ is subtracted from value $Si(x)$ of the shift register.

Figure 7:
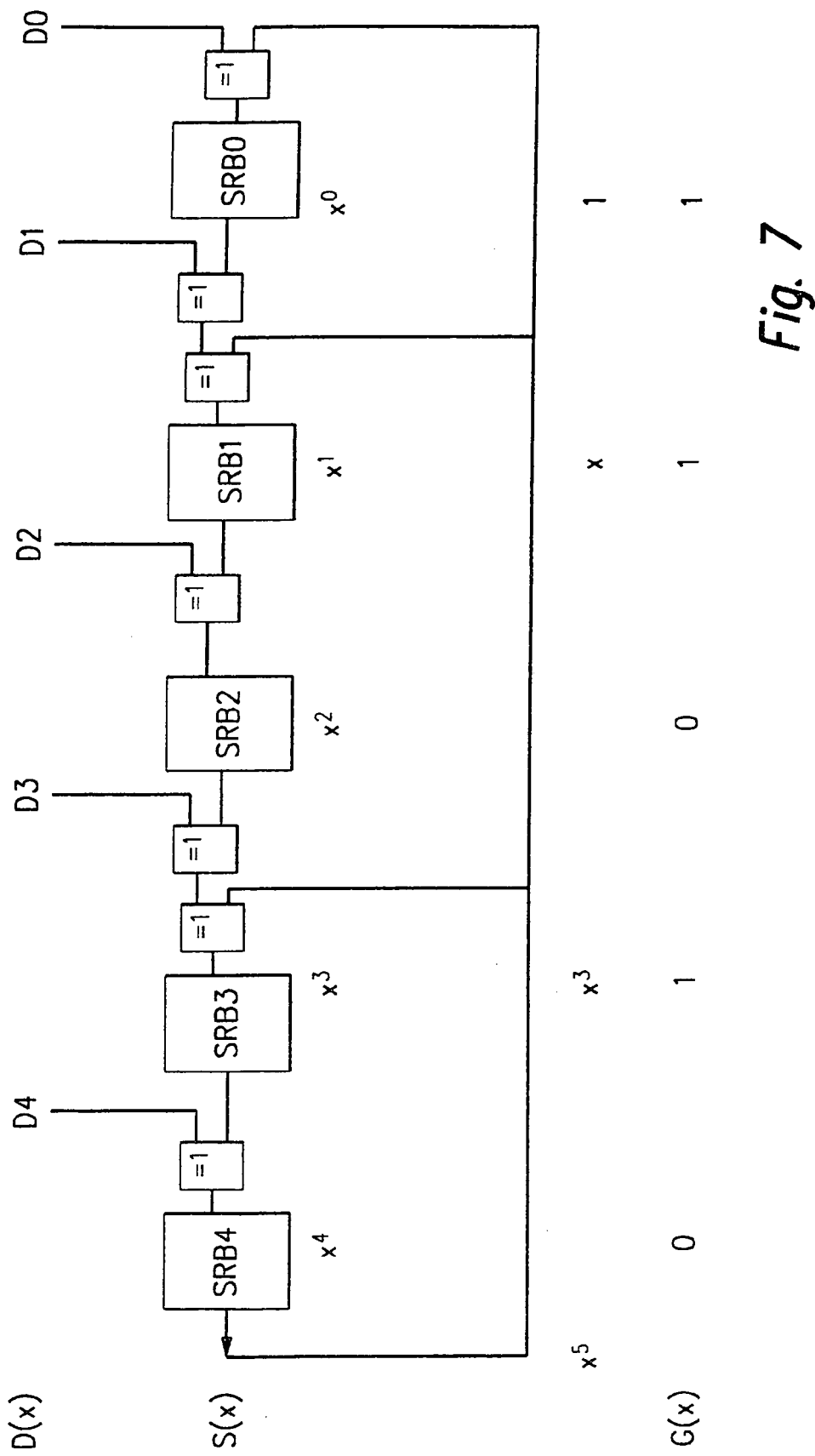
FIG. 7 shows the functional principle of the MISR signature formation method using EXOR operators.

In a software implementation of the MISR method, as shown for example in FIG. 5, the modulo 2 adders may be implemented as EXOR operations in accordance with FIG. 7. In places where two bits are to be combined by addition, one EXOR operation is provided, while in places where three bits are to be combined by addition, this is achieved by two consecutive EXOR operations. The hardware representation may be implemented in software by carrying out the following steps for each data word D to be processed.

1. Let the initial content of the signature register be 00000.
2. Shift the content of the signature register to the left by one position.

Mathematically, this signifies the multiplication of the signature register value by x, that is, $S_{i+1}(x)=xS_i(x)$.

3. Form EXOR from current data word $Di(x)$ to be read in and the content of signature register $S(x)$, that is, $S_{i-1}(x)=D_i(x)+xS_i(x)$.
4. If SRB4=1: Form EXOR from signature register $S(x)$ and generator polynomial $G(x)$. Consequently, $S_{i+1}(x)=S_{i+1}(x)+G(x)=[D_i(x)+xS_i(x)]modG(x)$.

The described signature formation via a ROM memory may be implemented on any arbitrary computing hardware. As already mentioned, four registers are required for implementing this signature formation method on a processor:

| | |
|---|---|
| ROM_Adr | as address register for the ROM; |
| Dx | as register for the current data word to be processed; |
| Sx | a signature register; and |
| Gx | as register for storing the generator polynomial. |

The symbolic program flow in assembler then is as follows:

| | |
|---|---|
| Start: | Load ROM_Adr with start address of ROM |
| Init: | Load Sx with 0 ($S_0(x) = 0$) |
| | Load Gx with generator polynomial |
| Loop: | Load Dx with content of ROM_Adr |
| | Increase ROM_Adr by 1 |
| MISR: | Shift Sx to the left by 1 bit, highest bit in carry bit (xS(x)) |
| | Form EXOR Dx with Sx (D(x) + xS(x)) |
| | If carry bit is set, form EXOR Sx with Gx ([D(x) + xS(x)]modG(x)) |
| | Compare ROM_Adr with end address ROME |
| | If not equal, go to Loop |

What is claimed is:

1. A method for transmitting data, comprising:
inverting the data to be transmitted;
forming, according to a specifiable signature formation method, a first signature as a function of both the data to be transmitted and the inverted data;
transmitting the first signature together with the data to a receiver;
inverting the transmitted data at the receiver;
forming a second signature in the receiver according to the specifiable signature formation method as a function of both the transmitted data and the inverted transmitted data; and comparing the first signature with the second signature.

2. The method as recited in claim 1, wherein:
at least one of the first signature and the second signature is formed in a bit-parallel manner in accordance with a signature register having multiple inputs.

3. The method as recited in claim 1, wherein:
at least one of the first signature and the second signature is formed over several messages.

4. The method as recited in claim 3, wherein:
at least one of the first signature and the second signature is transmitted by being distributed over several messages.

5. The method as recited in claim 1, wherein:
the data to be transmitted includes one of:
 input data of a precision of one bit and that arrives at processing units in messages via data buses, and
 calculation results that are redundantly generated in parallel on multiple computers,
in order to check a match of the data only the corresponding signatures are transmitted.

6. The method as recited in claim 1, wherein:
the method is used for checking a memory content of a memory area of one of a read-only memory, flash memory, and a read-write memory.

7. The method as recited in claim 6, wherein:
the data of the memory content to be verified are inverted,
a first signature is formed according to the specifiable signature formation method as a function of the data to be verified and of the inverted data and is stored as a setpoint signature in the memory area of the one of the read-only memory, the flash memory, and the read-write memory,
in order to verify the transmitted data located in the memory area to be verified, the transmitted data is inverted, and
as a function of the inverted transmitted data and of the transmitted data, the second signature is formed according to the specifiable signature formation method and is compared with the setpoint signature.

8. The method as recited in claim 1, wherein:
the method is carried out via a computer program stored on a memory element executable on one of a computing unit and a control unit corresponding to a processing unit.

9. The method as recited in claim 8, wherein:
the memory element includes one of a random access read-write memory, a read-only memory, and a flash memory.

10. A control unit for a motor vehicle, comprising:
at least one processing unit; and
a memory element in which a computer program is stored that is executable on the at least one processing unit, wherein when the at least one processing unit executes the computer program the following are performed:
inverting the data to be transmitted;
forming, according to a specifiable signature formation method, a first signature as a function of both the data to be transmitted and the inverted data;
transmitting the first signature together with the data to a receiver;
inverting the transmitted data at the receiver;
forming a second signature in the receiver according to the specifiable signature formation method as a function of both the transmitted data and the inverted transmitted data; and
comparing the first signature with the second signature.

* * * * *